Figure 4:
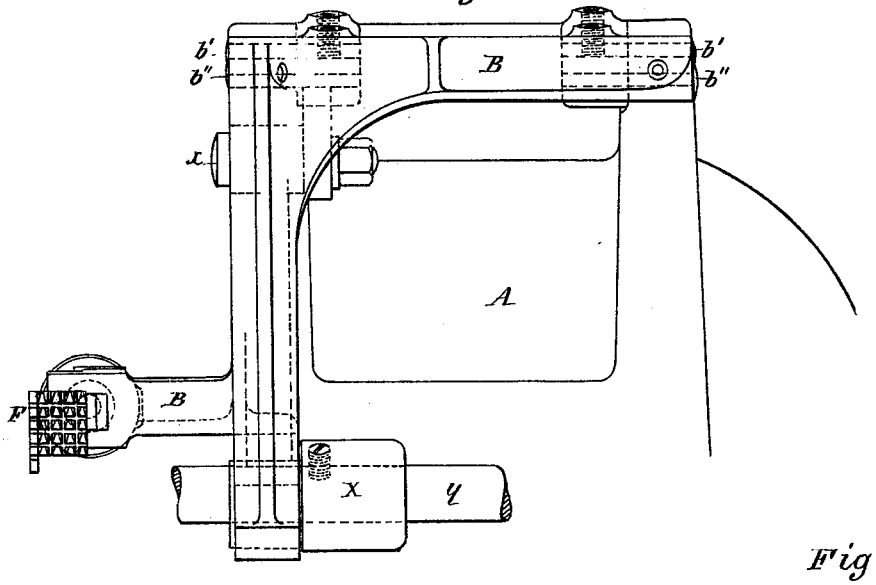

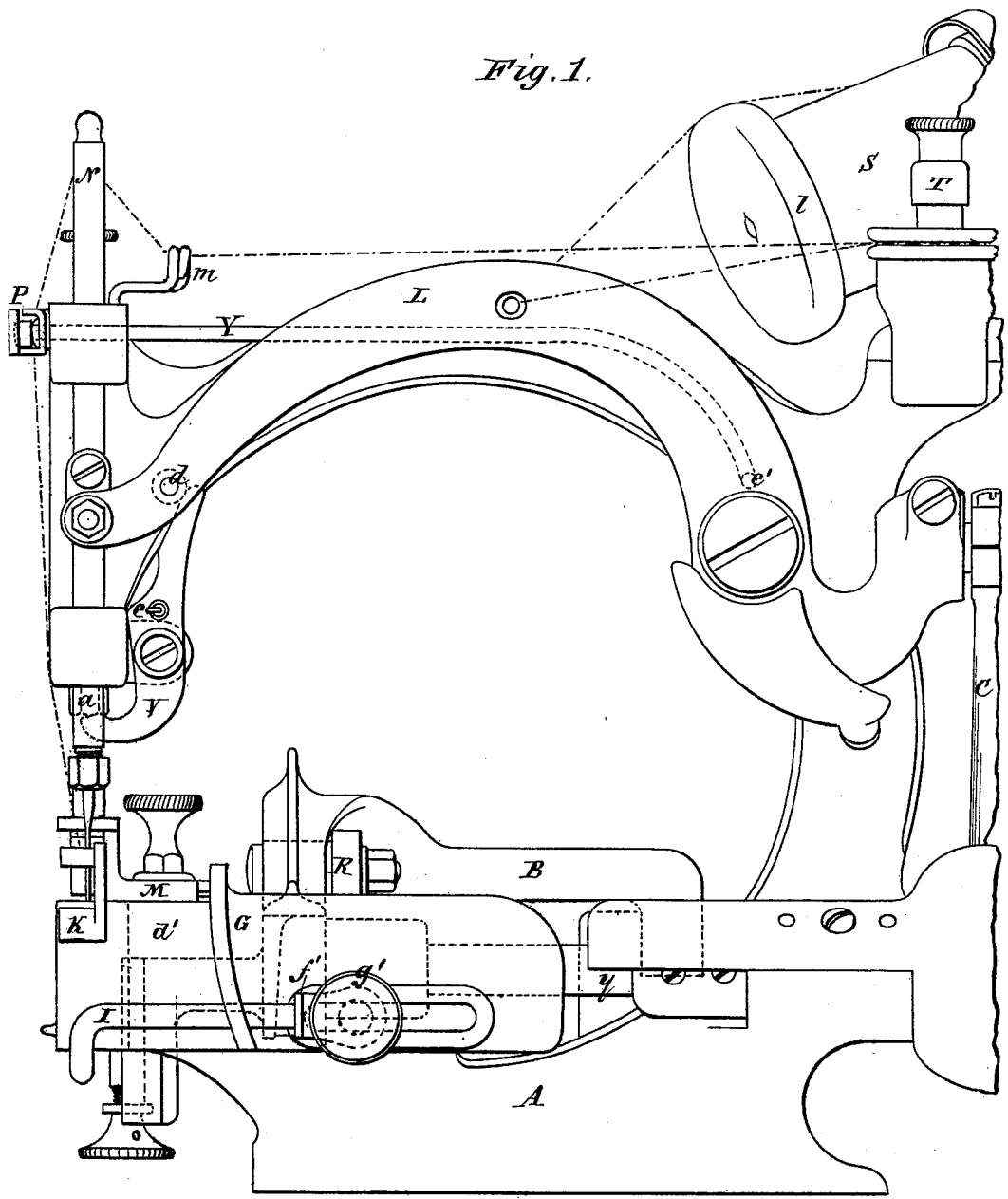

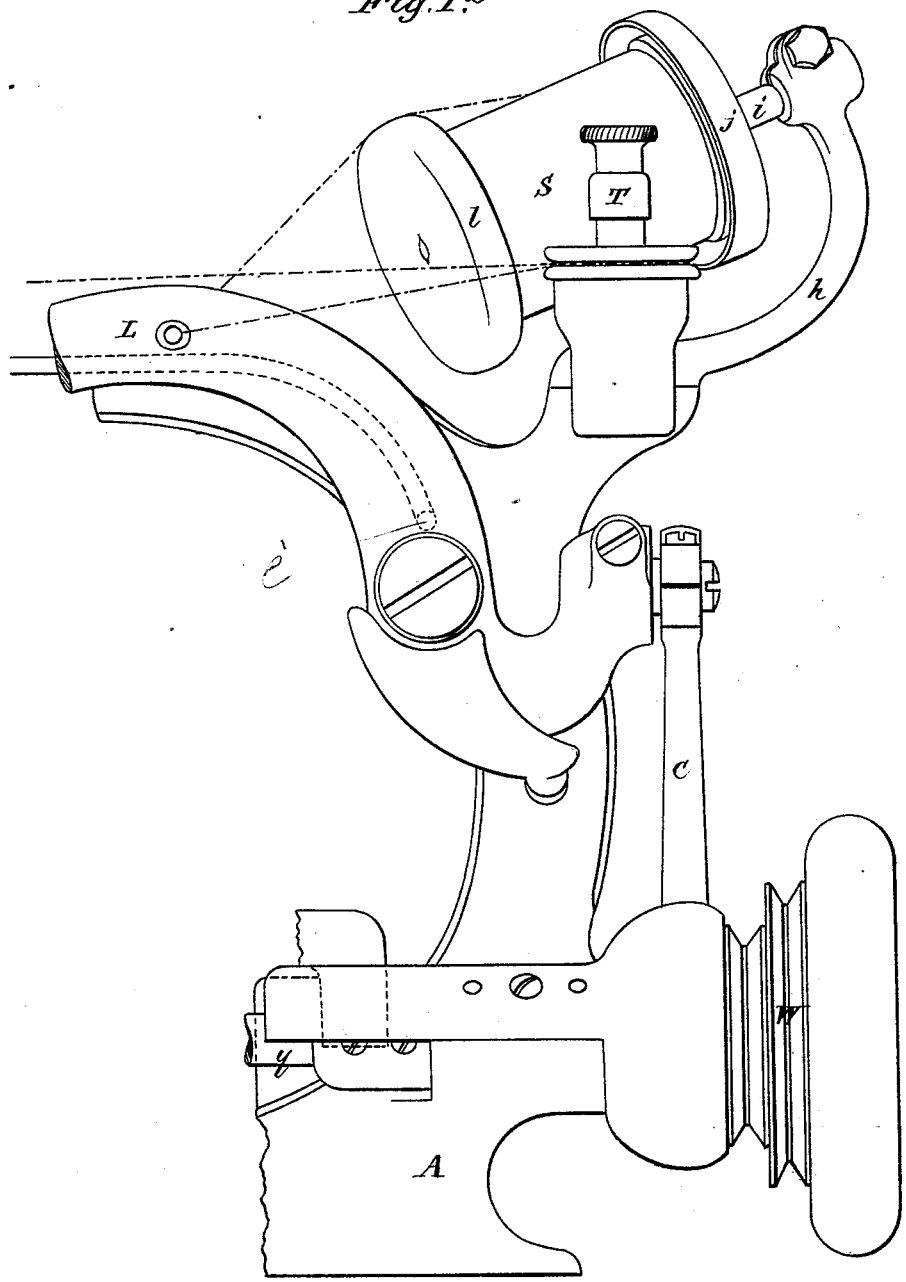

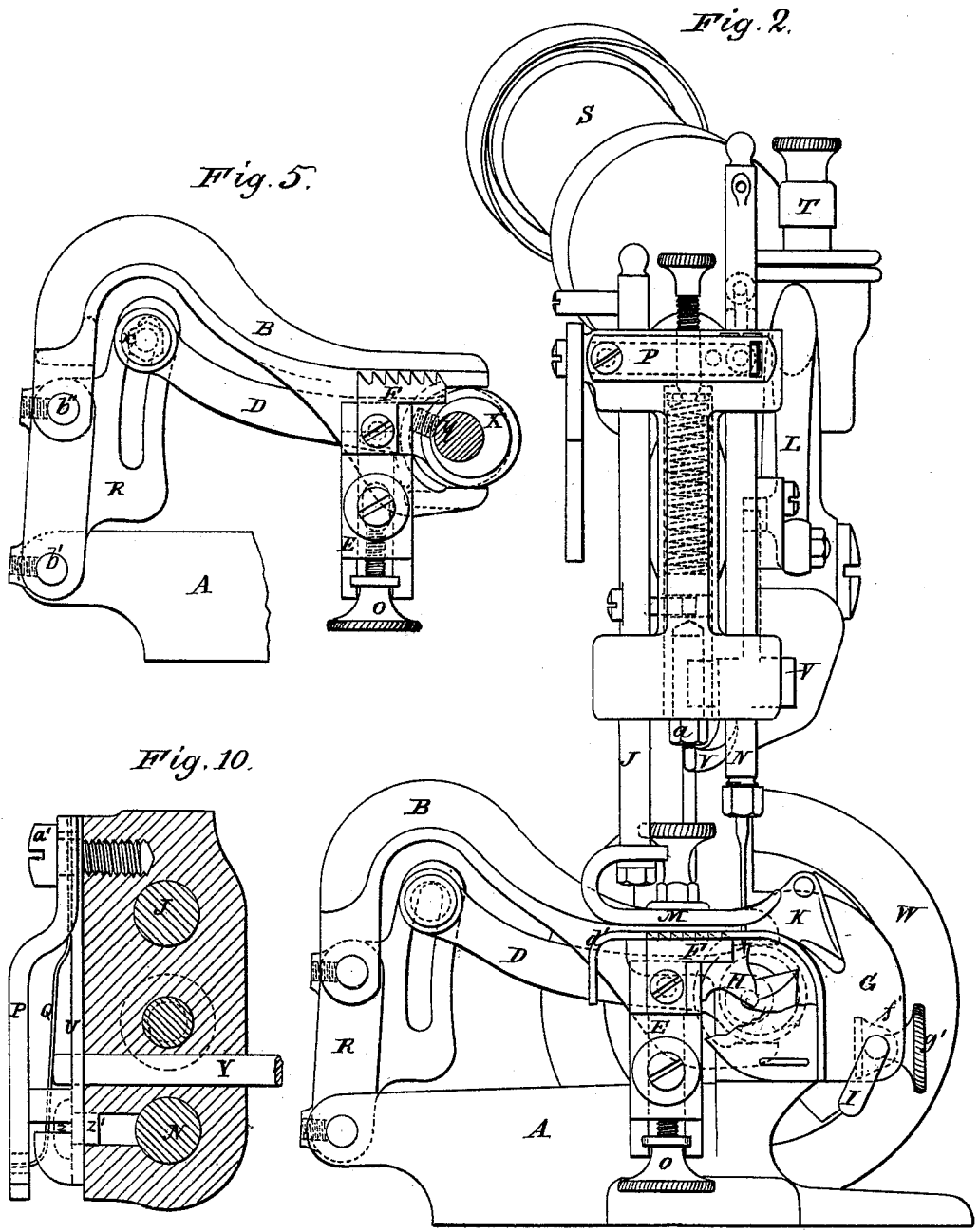

7 Sheets—Sheet 4.

C. H. WILLCOX.
Machine for Sewing Straw Braid, &c.
No. 218,413. Patented Aug. 12, 1879.

Witnesses:
E. E. Masson
O. F. Dick

Inventor:
Charles H. Willcox
by A. Pollok his Attorney.

C. H. WILLCOX.
Machine for Sewing Straw Braid, &c.

No. 218,413. Patented Aug. 12, 1879.

Witnesses
E. E. Masson

Inventor:
Charles H. Willcox
by A. Pollok
his attorney

C. H. WILLCOX.
Machine for Sewing Straw Braid, &c.
No. 218,413. Patented Aug. 12, 1879.
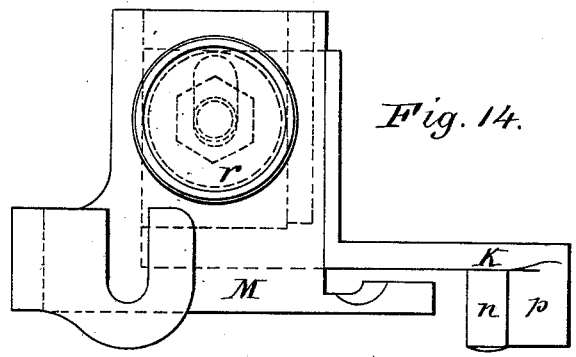
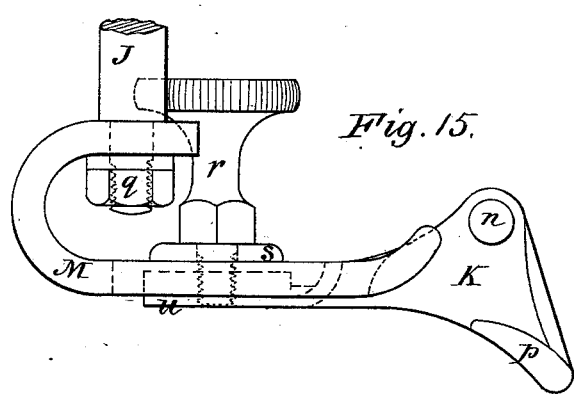
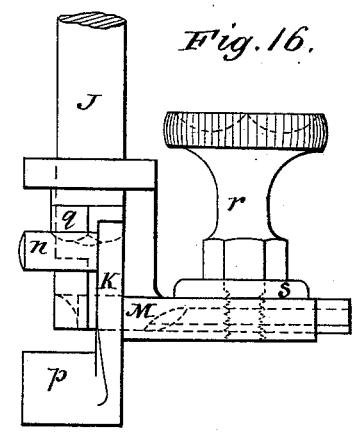
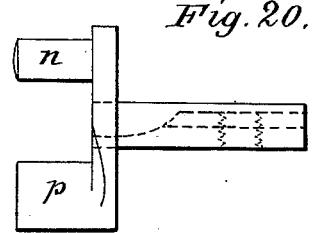
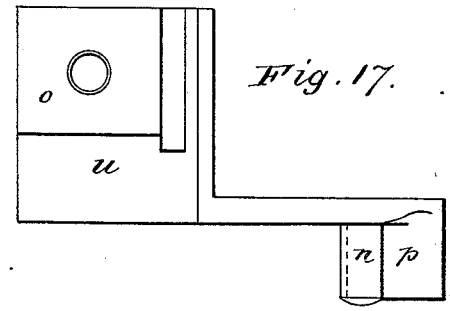
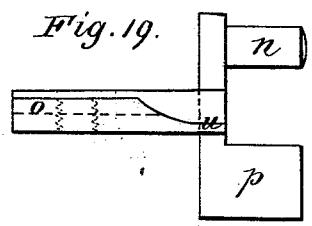
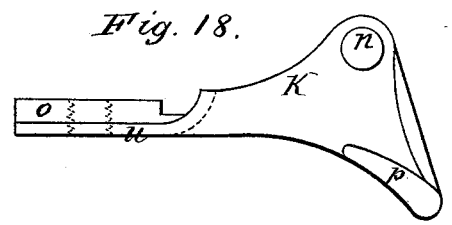
Witnesses:
E. E. Masson
E. A. Dick
Inventor:
Charles H. Willcox
by A. Pollok
his attorney C. H. WILLCOX.
Machine for Sewing Straw Braid, &c.

No. 218,413.  Patented Aug. 12, 1879.

Witnesses:
E. E. Masson
E. A. Dick

Inventor:
Charles H. Willcox
by A. Pollok
his attorney.

UNITED STATES PATENT OFFICE.

CHARLES H. WILLCOX, OF NEW YORK, N. Y.

IMPROVEMENT IN MACHINES FOR SEWING STRAW BRAID, &c.

Specification forming part of Letters Patent No. 218,413, dated August 12, 1879; application filed November 29, 1878.

*To all whom it may concern:*

Be it known that I, CHARLES H. WILLCOX, of New York city, in the county and State of New York, have invented a new and useful Improvement in Straw-Braid-Sewing Machines, which improvement is fully set forth in the following specification.

This invention relates to machines for sewing various materials, and more particularly to the kind known as "straw-hat-sewing machines," which are adapted to sew a continuous plait or braid of straw upon itself to form a hat. In this class of sewing-machines there were heretofore certain practical difficulties and objections in the way of the successful use of the machines for the purpose intended. What these objections are and the manner in which they have been overcome will be clearly shown in the description of the construction and operation of my improvement.

The invention consists, first, in a special feed-movement, as hereinafter described, in which the feed-surface is given the usual movement required in feeding, one eccentric producing the vertical as well as the backward and forward movement, which can be varied, as required, by suitable devices, thus making all the movements positive, and dispensing with the use of the spring usually employed to return the feed-bar and keep it in contact with the eccentric or cam producing the feed movement; second, in the location of the eccentric for producing the movements of the feed-surface on the side of the shaft-bearing opposite to that on which the needle-hole and stitch-forming mechanism are located, the feed-surface being carried by an extended arm, and in the construction and combination of parts of the feed mechanism; third, in a vibrator or device to intermittently relieve the pressure of the foot, to facilitate the turning of the work, adapted to be put into or out of action while the machine is in motion; fourth, in the special construction and arrangement of the vibrator and its parts; fifth, in the combination of the vibrator with the essential elements of a straw-sewing machine commencing a hat at the center or tip; sixth, in a tension device made to hold the thread taut or release it automatically at the proper time, of special construction and arrangement of parts; seventh, in the special attachment and adjustment of the work-guide upon the foot by a single screw; eighth, in the combination of a work-guide and separator-plate with particular devices for adjusting and holding the same; ninth, in the guide and separator-plate, provided with a projection adapted to form, when in position on the foot, a continuation thereof, to prevent the work from curling up, and to insure the stitches being made at the proper distance from the edges; tenth, in a particular form of plait-guide, adapted to embrace both edges of the plait or other material, the guide for the outer edge remaining stationary, while the guide for the inner edge is adjusted upon it as required for the width of the plait, the stationary part of the guide serving also to hold the plait to the throat-plate, all as hereinafter more fully set forth.

The following description will enable those skilled in the art to which it appertains to make and use my invention.

Figure 13:
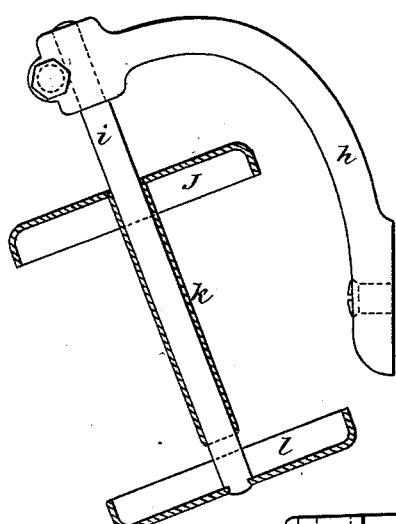
Figure 3:
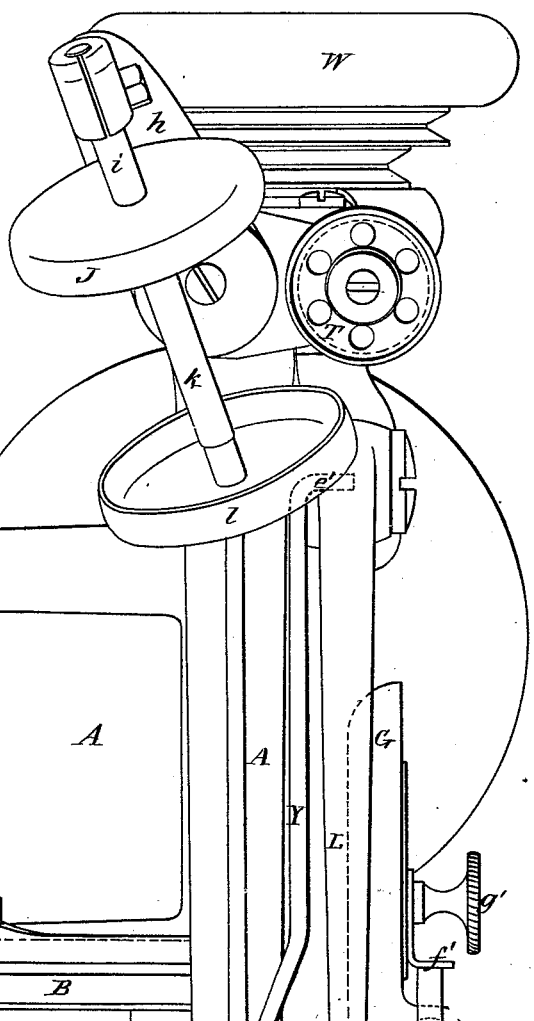
Figure 21:
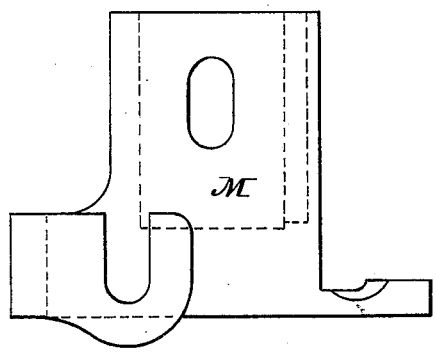
Figure 24:
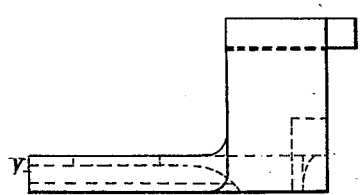
Figure 22:
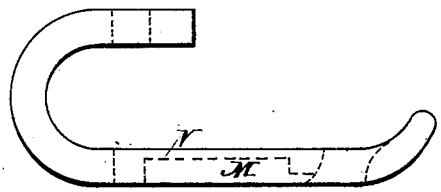
Figure 23:
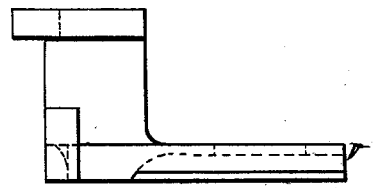
Figure 25:
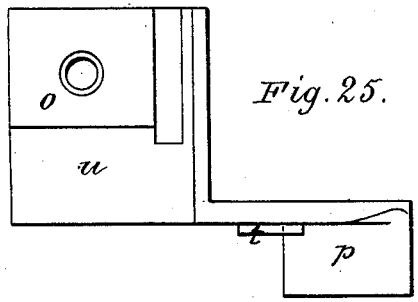
Figure 28:
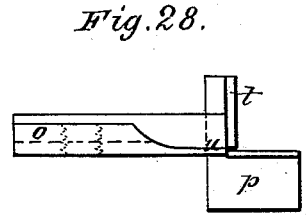
Figure 26:
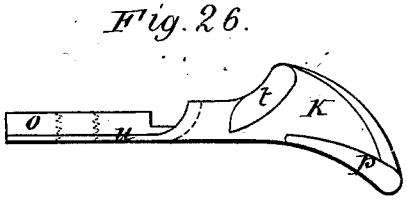
Figure 27:
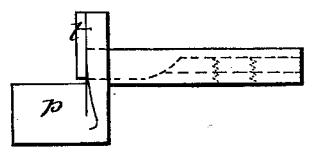

In the drawings, Figures 1 and 1$^a$ are partial views in front elevation, Fig. 2 an end elevation, and Fig. 3 a plan, of a Willcox & Gibbs sewing-machine to which my improvements are applied. Fig. 4 is a plan, Fig. 5 an end elevation, and Fig. 6 a front elevation, of the feed-movement. Fig. 7 is a plan, Fig. 8 a side elevation, and Fig. 9 a front elevation, of the vibrator, the supporting-frame being shown partly in section. Fig. 10 is a plan, Fig. 11 a side elevation, and Fig. 12 a front elevation, of the tension device, showing the operating-rod and a portion of the frame to which the tension device is attached. Fig. 13 is a side view of the spool-holder, partly in section. The foot and work-guide are shown in detail on a large scale in Figs. 14, 15, and 16, where these parts are clearly shown, together with the method of adjustment of the work-guide upon the foot and of securing the same firmly. Fig. 17 is a plan, Fig. 18 a side elevation, Fig. 19 a rear elevation, and Fig. 20 a front elevation, of the work-guide for medium and heavy plait. Fig. 21 is a plan, Fig. 22 a side elevation, Fig. 23 a front elevation, and Fig. 24 a rear elevation, of the presser-foot. Fig. 25 is a plan, Fig. 26 a side elevation, Fig. 27 a front elevation, and Fig. 28 a rear elevation, of the work-guide for chip and other thin plaits, which has modifications to adapt it to the work.

Like letters refer to like parts in all the drawings.

The frame A is like that used in the Willcox & Gibbs machines, modified only so far as necessary to introduce the improvements hereinafter described.

As the general construction of these machines is so well known, it needs no particular description here. I will therefore proceed to the description of the several improvements shown.

Figure 6:
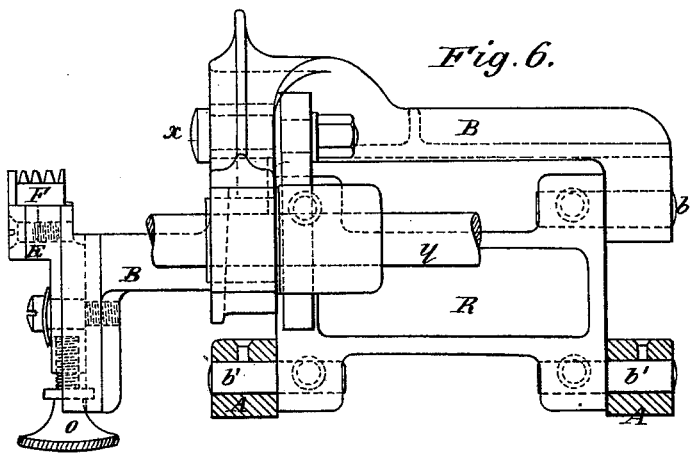
Figure 7:
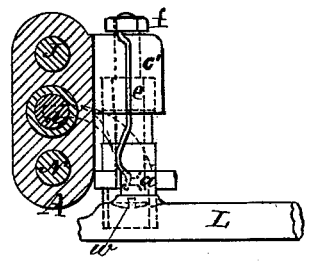

The feeding devices are shown in detail in Figs. 4, 5, and 6.

Two ears extend from the rear side of frame A, to which is hinged, by pins $b'\ b'$, the feed-rocker R, which is also in turn hinged at its upper side to the feed-bar B by means of the two pins $b''\ b''$, all these pins being fastened into the rocker by set-screws.

The feed-rocker R has a slotted flange, to which is fastened, by means of a nut, the stud $x$, in any desired position. The stud $x$ carries one end of the feed-rod D, which, at the other end, encircles the eccentric X, attached to the shaft $y$ of the machine. The outside of feed-rod D is fitted within the forked end of the feed-bar B, so that by turning the shaft $y$ of the machine the feed-bar B is given a vertical as well as a backward and forward movement, the latter depending upon the position of the stud $x$ in the feed-rocker R.

The feed-bar B carries upon its projecting arm the slide E, upon which is a tongue, working in a vertical groove in feed-bar B. The slide E is attached to the feed-bar by a screw and spring-washer, holding it securely in any position, while it is given a vertical adjustment by means of the thumb-screw O, which is screwed into a hole tapped in slide E, and has upon it a turned flange or collar, which works in a grooved recess in feed-bar B.

The feed-surface F is attached to the slide E, and is thus raised or lowered at pleasure, to adapt machines to various work, or to admit of adjustment after resharpening the feed-surface.

The whole of the feed-operating mechanism is carried far enough to the right to admit of the widest plaits being sewed without having the edge of the work come in contact with any part of the operating mechanism. The only portion of feed-bar B projecting under the throat-plate being the arm carrying the feed-surface F, the throat-plate can be reduced to the smallest practicable dimensions to admit of sewing a very small cylinder. The feed-eccentric X, being also to the right of the shaft-bearing, is removed from the wear caused by particles of straw working into the bearings when near the needle and looper. By this arrangement no spring is required, the movement of the feed in every direction being positive, while the length of the stitch can be varied at pleasure. The distance apart of the bearings of the rocker in the frame and of the feed-bar upon the rocker prevents any practical difficulty from the action of the feed-eccentric being so far removed from where the feed-surface takes hold of the work. This arrangement permits the back end of the feed-bar B to be suspended so far to the rear of where the feed-surface is attached that the rise and fall of the feed is practically vertical, and the upper surface of the feed-surface comes up to and remains, while feeding the work, practically parallel with the under surface of the presser-foot M—a result which is not attained in what may be called the "Bland arrangement," where the feed-block carrying the feed-surface is rocked upon the stud screwed into the crank of a rocker-shaft, thus giving the upper surface of the feed-surface, while feeding, a heel-and-toe, or changing movement.

Figure 9:
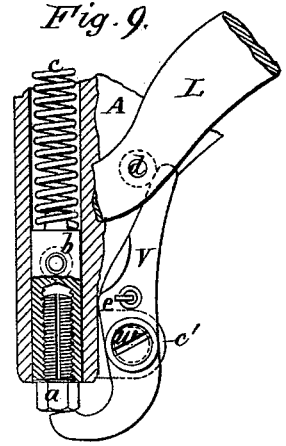
Figure 8:
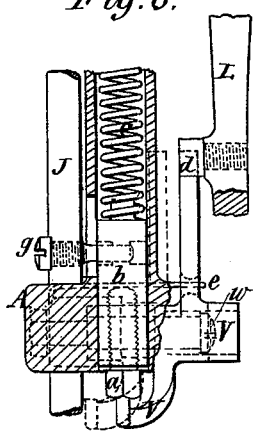

The vibrator is shown in detail in Figs. 7, 8, and 9.

A is a portion of the frame carrying the counterbored boss $c'$, into which is screwed the stud $w$, upon which the vibrator V works. The bent-wire spring $e$ is attached to the boss by nut $f$, screwed upon the projecting end of the stud $w$. The free end of the spring passes through a hole in the vibrator and causes it to bear against the frame opposite the spring $e$, as shown in Fig. 9. The vibrator is counterbored for the head of stud $w$, so as to permit it to be brought forward from the position shown, when out of action, by the dotted lines in Fig. 8, into the position shown by full lines, when, by the downward motion of lever L, the stud $d$ strikes the upper arm of the vibrator, and causes the under arm, by bearing against the adjusting-screw $a$, to lift the presser-foot M from contact with the work by means of the connection of the presser-bar J to the plunger $b$, to which it is attached by presser-bar screw $g$.

The spring $e$, by means of the angular bend near its end, either holds the vibrator out in position to be struck by pin $d$, or into the counterbored recess in the boss when its action is not desired.

The necessary adjustment to lift the presser-foot for various thicknesses of work is made by adjusting the screw $a$, which is split to make it work with sufficient friction in the tapped hole in plunger $b$, so that the action of vibration will not cause it to turn in the hole.

In commencing a hat at the center of the tip it is necessary to start a button or center, sewing it by hand, before the feed of the machine can take hold and advance the work. Another difficulty is found in endeavoring, under the pressure of the foot upon the feed-surface and the throat-plate, to turn the tip in the small circle required when sewing so near to the center of the tip.

The object of the above improvement is to cause the presser-foot to be lifted just clear of the work at the downward movement of the lever, its upward movement allowing the presser-foot to return into contact with the work ready for the action of the feed, the work, when the pressure of the foot is relieved, being readily turned to any extent, thus enabling the machine to start without a button, or with a much smaller one than is usually required. It also prevents the opening of the plait when sewing chip, tape, or other delicate braid, caused by attempting to turn it under the usual pressure of the foot. The pressure of the foot being intermittently relieved from the work also allows the tip to be sewed perfectly flat, if desired.

The vibrator can be put into or out of action while the machine is in motion, so that when a tip is sewed of sufficient diameter to no longer require its use, a touch at the center of vibrator throws it back and out of action, where it is held by spring $e$.

Devices to intermittently relieve the pressure of the foot to facilitate turning the work in ordinary sewing-machines are not new; so I make no claim, broadly, to such device.

Figure 12:
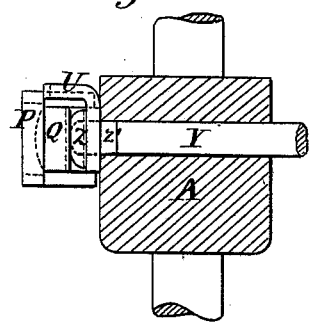
Figure 11:
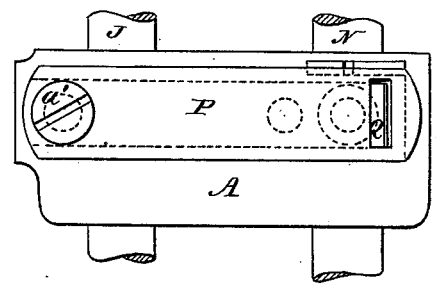

The tension device is shown in detail in Figs. 10, 11, and 12.

It is composed of the back plate, U, spring Q, shield P, and pad Z, and is attached to the frame by the screw $a'$, which, by the peculiar construction, binds the spring between the back plate and the shield, and at the same time attaches the whole firmly together and to the frame. A teat-pin, $Z'$, on the pad Z projects through the back plate, U, and into a hole made for it in the frame, thus forming a steady-pin.

Through a hole in the frame A and in the back plate, U, works a rod, Y, which is given an end motion by its connection with the lever L at $e'$, Figs. 1 and 3, its object being to push the spring Q away from contact with the pad Z at or about the time when the eye of the needle reaches the surface of the throat-plate $d'$, and so release the thread, which until that time has been held by the spring against the pad. This position of parts is clearly shown in Fig. 10.

The purpose of the tension device is to keep the thread taut until the needle has fairly entered the work, after which its pressure must be removed in order to permit a proper loop to be thrown for the looper H to enter.

A tension device made to open and release the thread at the proper time has been in use for a long time upon the Willcox & Gibbs machines; but it soon wears so as to lose its proper action and requires renewal or adjustment. I therefore do not intend to claim, broadly, this device as my invention.

Durability and simplicity of parts are obtained by my construction and arrangement.

The shield P has a slot at its forward end, into which the bent end of the spring Q is always shielded, so that in wiping the machine there is no danger of bending or injuring it.

From the construction of the parts, it will be seen that the proper operation of the tension device will not be affected materially by any wear of the machine, as the motion of the rod Y is very slight and only touches the spring to relieve the pressure on the thread. A portion of the back plate, U, is bent over and has a slot, which retains the thread in its proper position between the spring Q and the pad Z.

If the spring and pad should become cut in by the friction of the thread, they can readily and cheaply be exchanged for new parts, and so restore the tension device to proper working order without other adjustment.

The spool-holder is shown detached in Fig. 13. It consists of the holder $h$, which is attached to the frame of the machine, and holds at its end by means of a clamp the pin $i$, to one end of which is attached a cupped disk, $l$, the thread being unwound from the spool without turning it, by being pulled in line with the axis of the pin $i$, the thread being against the periphery of the disk $l$ as it unwinds, as shown clearly in Fig. 1, where S represents the spool of thread.

A disk, $j$, is attached firmly to the sleeve $k$, which fits loosely upon the pin $i$. The spool is placed upon the sleeve $k$, and the pin $i$ is then passed through the sleeve $k$ and fastened into the holder $h$, the angle at which the pin $i$ stands causing the disk $j$ always to remain in contact with the end of the spool S, the flange upon the disk $j$ preventing the coils, as they spring out from the spool, from escaping over the end.

The same effect would be obtained if the disk $j$ were permanently attached to the holder $h$ and the pin $i$ adjusted lengthwise in the holder $h$, so as to leave just room enough for the spool S between the two disks; or the disk $j$ might be attached, by friction or a set-screw, to the pin $i$, in any desired position.

The work-guide and separator-plate are shown, in connection with the presser-foot, in Figs. 14 to 28, inclusive.

The presser-foot, with adjustable work-guide and separator-plate combined—the invention of Henry Bland—is the subject of an application filed October 17, 1878, now before the Patent Office. I do not, therefore, intend to claim, broadly, this combination.

The object of my improvement is to provide convenient and secure means for attaching the work-guide to the presser-foot and adjusting it thereon, using but one screw, which is so arranged that it can be fastened firmly, to resist the tendency of the vibration caused by the action of the feed to loosen or move it from its proper position.

In the device as shown by Bland this is attained by the use of two adjusting-screws, both of which have to be used in order to adjust the work-guide upon the presser-foot.

The presser-foot M, which is attached to the presser-bar J by the nut $q$, has milled into its under side a groove, $v$, into which is fitted the tongue $o$ of the work-guide K. In the presser-foot M is a slot, through which passes the thumb-screw $r$, which screws into a hole tapped through the tongue $o$ of the work-guide, and, by means of a washer, $s$, clamps the two firmly together, the thumb-screw r being constructed so that by means of a wrench it may be very tightly fastened, if required. The upper surface of the tongue o bears against the bottom of the groove r in the foot, the thin edge u of the work-guide at the same time just bearing against the under side of the presser-foot to form the guide for the edge of the work, the whole being so arranged that the greatest movement of the work-guide never uncovers the groove r in the presser-foot, thus leaving a good surface for the feed to act against in feeding the work.

In the work-guide for medium and heavy plait there is a pin, n, which is intended to hold the edge of the work so that it will enter under the presser-foot M. This is omitted in the work-guide for chip, and in place thereof a small projection, t, is attached to the face of the work-guide, which, when placed in position on the presser-foot, forms a continuation of the toe of said presser-foot M, and holds the edge of the work from curling up, and insures the stitches being made at the distance from the edge to which the work-guide is adjusted.

In the form of work-guide just described the thin edge u is made much thinner than in the guide used for heavier work, as this edge should never exceed the thickness of the plait being sewed, so that the feed may take hold of the plait where lapped and sewed together, and not feed upon the entering plait alone, which it would do if the edge u of the work-guide were thicker than the plait. This also permits the presser-foot to bear upon the work around the needle-hole in the throat-plate as the needle penetrates it.

The separator-plate p, which should always be as near to the needle as possible, in order to prevent the work from escaping under the work-guide, it will also be observed, is brought much nearer to the needle than in the guide for heavier work, as the space between the separator-plate and toe of the presser-foot in thin work can be much reduced, space sufficient to permit the passage of two thicknesses, at least, of the plait always being required. The small projection t on work-guide for chip forms the continuation of the toe of the foot M, and admits of the work-guide being moved, and still holds the edge of plait down while being sewed.

The plait-guide is shown attached to the machine in Figs. 1, 2, and 3. The peculiarity of this guide consists in the pin I, which has its outer end bent down to form a guide for the outer edge of the plait. The pin I passes freely through a hole in the flange of plait-guide G, and is attached to washer f', which has a hole in it fitting the body of the thumb-screw g', by means of which the plait-guide is adjusted and secured to the frame. By this arrangement the bent end of pin I, which serves only to hold the plait against the flange of plait-guide G, always remains in the same position, while the position of the guide may be varied to suit the various widths of plait, and no adjustment of the pin is required.

The plait can be readily inserted or removed by passing it edgewise between the bent end of pin I and the lower edge of the throat-plate d'.

The direction from which the plait is brought from the reel prevents any tendency of the plait to escape from its position between the bent end of pin I and the face of plait-guide G. The inner surface of the bent end of the pin I always holds the plait sufficiently to the right, so that its inner edge is kept against the plait-guide as it feeds in under the work-guide and presser-foot.

Adjustable guides to embrace both edges of plait or other material in sewing-machines are not novel. I therefore only desire to claim the peculiar arrangement shown and described, by which the guide for the outer edge of the plait remains stationary, while the guide for the inner edge is adjusted upon it as required for the width of plait, the pin I also serving to hold the plait, as it enters the machine, from springing up and escaping over the edge of the plait-guide.

Having thus fully described my said invention, and the manner in which the same is or may be carried into effect, what I claim, and desire to secure by Letters Patent, is—

1. The combination, with a feed-rocker hinged to the machine-frame, and a feed-rod encircling an eccentric at one end and attached at the other end to the feed-rocker by means of a loose connection, adjustable, as described, of a feed-bar secured at one end by a hinged joint to the feed-rocker, and at the other fitting over the outside of the feed-rod encircling the eccentric by means of a fork in the end, the feed-surface being connected with the said feed-bar, substantially as set forth.

2. The feed-bar provided with an arm carrying the feed-surface, in combination with the rotary shaft located below the throat-plate, and eccentric secured thereon upon the side of the shaft-bearing opposite to that on which the needle-hole, stitch-forming mechanism, and feed-surfaces are located, and connections for imparting to the feed-bar the requisite movements from the eccentric, substantially as described, whereby the said eccentric is removed from the wear caused by the particles of the material sewed working into the bearings when near the needle and stitch-forming mechanism, as set forth.

3. The combination, in a sewing-machine, with an eccentric, a feed-rod encircling the same, and a feed-rocker connected with the feed-rod by an adjustable loose connection, of a feed-bar forked at one end and provided with an arm carrying the feed-surface, the forked end of said feed-bar fitting over the feed-rod encircling the eccentric, the opposite end being connected by a hinge-joint to the feed-rocker, and the arm carrying the feed-surface extending under the throat-plate for the required distance, substantially as described.

4. The combination of the feed-rocker and feed-bar, hinged to said rocker by means of two pins, the said feed-bar being provided with a projecting arm carrying the feed-surface, with operating mechanism, substantially as described.

5. The combination, with the presser-bar and needle-arm of a sewing-machine, of a vibrator and means for attaching the same to a part of the frame of the machine, and for permitting it to be put into and out of action while the machine is in motion, substantially as described.

6. The combination, with the presser-foot and presser-bar of a sewing-machine, and the spring to press the same downward upon the work, of a vibrator, secured to the machine-frame by a pin, upon which it is free to vibrate, and on which it is also capable of a sidewise motion, a spring to retain the vibrator in position in or out of action on the pin, and operating mechanism, substantially as described.

7. The combination, in a straw-sewing machine commencing a hat at the center or tip, with the presser-foot and work-guide secured thereto, of a vibrator adapted to automatically relieve the pressure of the presser-foot at intervals, substantially as described.

8. The herein described tension device for holding the thread taut and automatically releasing it at the proper time, the same consisting of a pad and spring, between which the thread is passed, and a rod operated by the motion of the needle-moving lever to press back the spring and release the thread, substantially as described.

9. In a tension device for sewing-machines, the combination of a pad having a teat-pin resting in a hole in the frame, and a spring pressed by its own elasticity against the face of the pad to retain the thread in position thereon, substantially as set forth.

10. The combination, in a tension device, with the pad having a teat-pin for securing the same to the frame, of the spring and shield, substantially as set forth.

11. A tension device for sewing-machines, composed of a pad having a teat-pin, a spring and shield, and a back plate, with or without a slotted bent-over portion to retain the thread in the proper position between the spring and pad, the several parts being adapted to be secured to the frame of the machine by a single screw and a steady-pin formed by the teat-pin of the pad projecting through the back plate, substantially as described.

12. The combined presser-foot, work-guide, and separator-plate, consisting of the presser-foot, work-guide, and separator-plate, adjustably secured together by means of a tongue and groove and a single set-screw working through a slot, substantially as set forth.

13. The combination of a work-guide and separator-plate provided with a tongue, and the foot of a sewing-machine having a groove on the under side thereof, and a slot cut through the same above the groove, with a thumb-screw passing through the slot and screwing into a hole in the tongue on the guide and separator-plate, to secure the same to the foot in an adjustable manner, the whole being arranged as described, whereby the greatest movement of the work-guide never uncovers the groove in the foot, substantially as described.

14. A work-guide and separator-plate adapted to be adjustably secured to the foot of a sewing-machine, provided with a projection arranged to form a continuation of the foot when the guide is secured in position thereon, substantially as described.

15. The combination, to form a plait-guide, of a pin having its outer end bent down to form a guide for the outer edge of the plait, the plait-guide proper, and a thumb-screw, the pin passing through a hole in the flange of the guide and attached at its inner end to a washer through the hole in which passes the thumb-screw, by means of which the guide is adjusted and secured to the frame, substantially as described.

In testimony whereof I have signed this specification in the presence of two subscribing witnesses.

CHAS. H. WILLCOX.

Witnesses:
R. S. HAYWARD,
JOSEPH BIRD.